United States Patent

[11] 3,585,471

| [72] | Inventor | Edoardo Ecclesia<br>Ivrea, Turin, Italy |
|---|---|---|
| [21] | Appl. No. | 829,978 |
| [22] | Filed | June 3, 1969 |
| [45] | Patented | June 15, 1971 |
| [73] | Assignee | Ing. C. Olivetti & C., SpA<br>Ivrea, Turin, Italy |
| [32] | Priority | June 7, 1968 |
| [33] | | Italy |
| [31] | | 51950-A/68 |

[54] MULTIFREQUENCY, MULTIVOLTAGE STATOR CIRCUITS FOR ALTERNATING CURRENT MOTORS
3 Claims, 1 Drawing Fig.

| [52] | U.S. Cl. | 318/225 |
|---|---|---|
| [51] | Int. Cl. | H02p 7/36 |
| [50] | Field of Search | 318/220, 221, 225 |

[56] References Cited
UNITED STATES PATENTS

| 1,912,207 | 5/1933 | Kennedy | 318/225 |
|---|---|---|---|
| 2,823,342 | 2/1958 | Suhr | 318/225 X |
| 2,860,296 | 11/1958 | Mollenberg | 318/225 X |

*Primary Examiner*—Benjamin Dobeck
*Assistant Examiner*—Gene Z. Rubinson
*Attorney*—Birch, Swindler, McKie & Beckett ABSTRACT: A stator circuit of an alternating current motor is provided with at least an additional winding which is serially connected with the main stator winding when the motor is to be operated by a voltage at a predetermined frequency, and which may be bypassed through a manual switch as an additional inductance when the motor is to be operated by a voltage at a frequency higher than the predetermined frequency. The main winding is formed of two equal parts which can be connected either serially or in parallel to enable the motor to be operated at two different voltage levels.

PATENTED JUN 15 1971 3,585,471
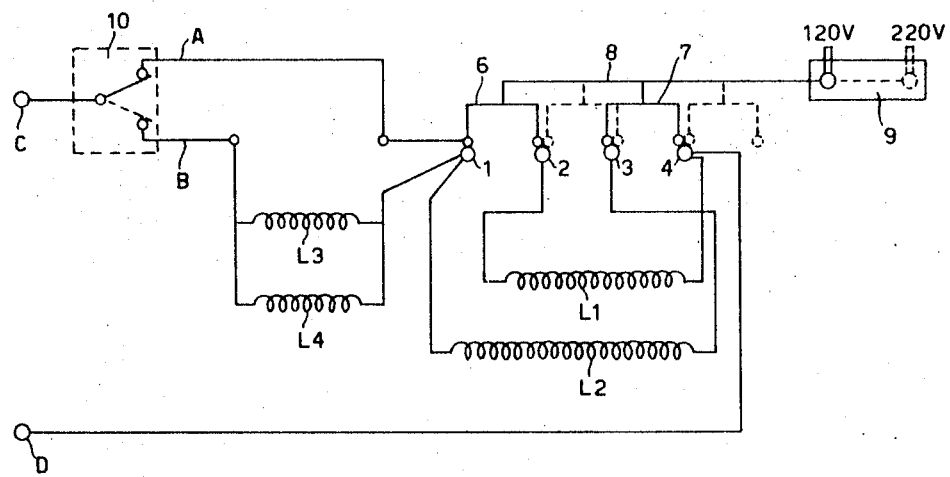
INVENTOR.
EDOARDO ECCLESIA

MULTIFREQUENCY, MULTIVOLTAGE STATOR CIRCUITS FOR ALTERNATING CURRENT MOTORS

The present invention relates to improvement in stator circuits for an alternating-current motor which is intended for use with more than one supply voltage and frequency.

In known AC motors, used for example in office machines, air conditioners and domestic appliances, the problem of variations in the supply voltage and frequency leads to a number of drawbacks. Such apparatus is widely used and thus commands a considerable market, but the domestic mains voltage available to the user varies from country to country, and the frequency of the voltage is likewise variable. One of the problems facing manufacturers of electric motors for domestic appliances arises from this diversity of voltages and frequencies in the supply mains in various countries, making it necessary for the manufacturers to produce different motors for the different countries. Some of them have endeavored to overcome this problem by designing a single type of motor the windings of which are able to stand up to different supply voltages and frequencies, constructing both the mechanical and the electrical parts of the motor in such a way that it can function acceptably at the different voltages, but unavoidably this is achieved at the cost of efficiency.

Other manufacturers have overcome the problem with the aid of complex electrical circuits and high-precision mechanical devices, but these increase the overall cost of such motors.

According to the invention there is provided a stator circuit for an alternating-current motor comprising first and second windings, and two switches each having at least two positions, one switch being so arranged as in one position to connect two parts of the first winding in series and in another position to connect two parts of the first winding in parallel, and the other switch being so arranged as in one position to connect the second winding to the first winding and in another position to disconnect the second winding from the first winding.

The said one switch is in use positioned in dependence upon the supply voltage and the said other switch is positioned in dependence upon the supply frequency. The circuit can, therefore, operate with two or more different supply voltages and two or more different supply frequencies.

Preferably, the said two parts of the first winding which are connected in series are the same two parts as are connected in parallel, and also the said other switch is arranged to connect the two windings in series.

A preferred embodiment of the invention will now be described, by way of an example, with reference to the accompanying drawing, the sole figure of which is the circuit diagram of a stator circuit embodying the invention.

The winding of the stator is shown schematically in the diagram by two sets of turns L1 and L2 which are connected between contacts 2 and 3, and 1 and 4, respectively. The motor is a normal AC motor of the "schematic pole" type, and has two poles and a single coil which constitutes the winding of the stator.

The rotor is of the usual squirrel-cage type. Two contacts or bridges 6 and 7 are interconnected by a bar 8, which is integral with a sliding voltage switch 9. The switch 9 is of the two-position type and, as described below, is used to change over between two supply voltages, e.g. 120 and 220. With the voltage switch 9 in the position corresponding to 120 and shown in full lines, the bridge 6 connects the contacts 1 and 2 and the bridge 7 connects the contacts 3 and 4. With the voltage commutator 9 in the position corresponding to 220, shown in broken lines, the bridge 6 connects the contacts 2 and 3, while the bridge 7 does not establish any connection.

Connected to the contact 1 are an ingoing conductor A and two sets of stator turns L3 and L4 connected in parallel and in their turn connected to an ingoing conductor B. The conductors A and B are connected to a single-pole double-throw switch 10, which receives an input voltage via a terminal C. The other input terminal D is connected to contact 4.

In one position of the switch 10, a connection is made between the conductor A and the input terminal C, and the stator winding is connected directly between the terminals C and D in readiness for a supply voltage with frequency 60 Hertz.

In this position of the switch 10 the stator winding effectively consists solely of the two sets of turns L1 and L2. If, on the other hand, the stator circuit is fed with a voltage of 50 Hertz at the terminals C and D, the switch 10 is moved to the other position (shown by a broken line in the figure), thus connecting the parallel arrangement of the sets of turns L3 and L4 in series with the turns L1 and L2. In this second case, the current passing through each turn of the stator winding is the same as in the first case of a supply frequency of 60 Hertz. In fact, when the supply frequency is varied, the impedance of the stator circuit likewise varies, the said impedance being a function of the frequency. Consequently, when the frequency is reduced, since the inductive part predominates in the impedance of the circuit, the switch 10 enables the supplementary turns L3 and L4 to be inserted, in order to maintain the inductive impedance, and thus the total impedance of the circuit, at a constant level. Consequently, in the two cases of a 50 Hertz and a 60 Hertz supply, the current per turn of the winding is constant, so that the motor functions in substantially the same way and the same efficiency.

As well as the frequency, the voltage of the mains supply may vary, and in particular, the voltage may take the values 120 volts and 220 volts.

If a feed voltage of 120 is applied across the terminals C and D, the switch 9 is moved to the position corresponding to 120, so that the bridges 6 and 7, moved by the bar 8 will respectively connect the contacts 1 to 2, and 3 to 4, as can be seen in the figure. With these connections, the turns L1 and L2 are connected in parallel between the contacts 1 and 4. If, on the other hand, the terminals C and D are subjected to a supply voltage of 220, then the switch 9 is placed in the position corresponding to 220, so that the bridge 6, connects the contacts 2 and 3, while the bridge 7 does not establish any connection, as shown by the broken lines in the figure. With these connections, the turns L1 and L2 are placed in series between the contacts 1 and 4.

When the supply voltage varies, the switch 9 is operated so as to keep the current flowing through each turn of the stator winding practically constant so that the functioning of the motor remains constant.

What we claim is:

1. A stator circuit for an alternating current motor, comprising:
    first winding means having a predetermined impedance at a first predetermined frequency,
    second winding means adapted to be connected to said first winding means so that the impedance of the connected combination of said first and second winding means is substantially equal to said predetermined impedance at a second predetermined frequency relatively lower than said first frequency, and,
    switch means for connecting said first winding to the stator input voltage in a first position and to said second winding means in a second position, said second winding means being connected to the input voltage.

2. The stator circuit defined in claim 1 wherein said first winding means comprises two winding parts and further comprising:
    voltage selecting switch means positionable to a first position for connecting said winding parts in series or to a second position for connecting said winding parts in parallel, whereby the motor may be coupled to either of two values of input voltage.

3. The stator circuit defined in claim 1 wherein said second winding means comprises two winding parts connected in parallel.